(12) United States Patent
Caruso et al.

(10) Patent No.: US 9,719,490 B2
(45) Date of Patent: Aug. 1, 2017

(54) WIND TURBINE BLADE WITH BOND PASTE INSPECTION WINDOW AND ASSOCIATED METHOD

(71) Applicant: General Electric Company, Schenectady, NY (US)

(72) Inventors: Christopher Daniel Caruso, Greenville, SC (US); Aaron A. Yarbrough, Clemson, SC (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 14/529,275

(22) Filed: Oct. 31, 2014

(65) Prior Publication Data

US 2016/0123298 A1 May 5, 2016

(51) Int. Cl.
| | |
|---|---|
| *F03D 1/06* | (2006.01) |
| *B29C 65/54* | (2006.01) |
| *B29C 65/48* | (2006.01) |
| *F16B 11/00* | (2006.01) |
| *B23P 15/04* | (2006.01) |
| *B29C 65/00* | (2006.01) |
| *F03D 80/50* | (2016.01) |

(52) U.S. Cl.
CPC ............ *F03D 1/0683* (2013.01); *B23P 15/04* (2013.01); *B29C 65/48* (2013.01); *B29C 65/54* (2013.01); *B29C 66/1162* (2013.01); *B29C 66/54* (2013.01); *B29C 66/97* (2013.01); *F03D 1/0675* (2013.01); *F03D 80/50* (2016.05); *F16B 11/006* (2013.01); *B29C 65/483* (2013.01); *B29C 65/542* (2013.01); *B29C 66/543* (2013.01); *Y02E 10/721* (2013.01)

(58) Field of Classification Search
CPC .... F03D 1/0675; G01N 21/9072; B23P 15/04
See application file for complete search history.

(56) References Cited

U.S. PATENT DOCUMENTS

| | | | | |
|---|---|---|---|---|
| 2,800,788 | A * | 7/1957 | Smith | ................... G01M 3/027 362/294 |
| 6,742,258 | B2 * | 6/2004 | Tarbutton | ............. B21D 26/033 29/421.1 |
| 6,762,409 | B2 * | 7/2004 | Fritsch | ............... G01B 11/0625 250/339.07 |

(Continued)

OTHER PUBLICATIONS

European Search Report and Opinion issued in connection with corresponding EP Application No. 15191337.3 on Feb. 25, 2016.

*Primary Examiner* — Dwayne J White
*Assistant Examiner* — Topaz L Elliott
(74) *Attorney, Agent, or Firm* — Dority & Manning, P.A.

(57) ABSTRACT

A wind turbine blade has an upper shell member and a lower shell member bonded at a leading and trailing edge of the blade with a bond paste applied between respective forward and rearward edges of the shell members. At least one of the shell members includes a first inspection window defined therein along one of the leading edge or trailing edge at a location corresponding at least to a design minimum bond width of the bond paste applied at the respective leading edge or trailing edge. The inspection window provides a visible access through the shell member such that a visible indication is generated through the inspection window when bond paste is injected and reaches the minimum bond width location in the chord-wise direction.

16 Claims, 8 Drawing Sheets

(56) References Cited

U.S. PATENT DOCUMENTS

| | | | |
|---|---|---|---|
| 7,988,422 B2* | 8/2011 | Dixon | F03D 1/0675 29/463 |
| 8,038,407 B2 | 10/2011 | Rao | |
| 8,047,799 B2 | 11/2011 | Nies | |
| 8,047,800 B2 | 11/2011 | Nies | |
| 8,156,711 B2* | 4/2012 | Hethcock | B64C 1/068 244/123.1 |
| 8,409,381 B2 | 4/2013 | Ramm et al. | |
| 8,425,196 B2 | 4/2013 | Fritz et al. | |
| 8,454,311 B2* | 6/2013 | Hiremath | G01N 29/14 356/73 |
| 2011/0209347 A1 | 9/2011 | Deak et al. | |
| 2011/0215585 A1 | 9/2011 | Caires | |
| 2014/0033799 A1 | 2/2014 | Newman | |
| 2014/0139211 A1 | 5/2014 | Godbole et al. | |
| 2014/0294593 A1 | 10/2014 | Liu | |

\* cited by examiner

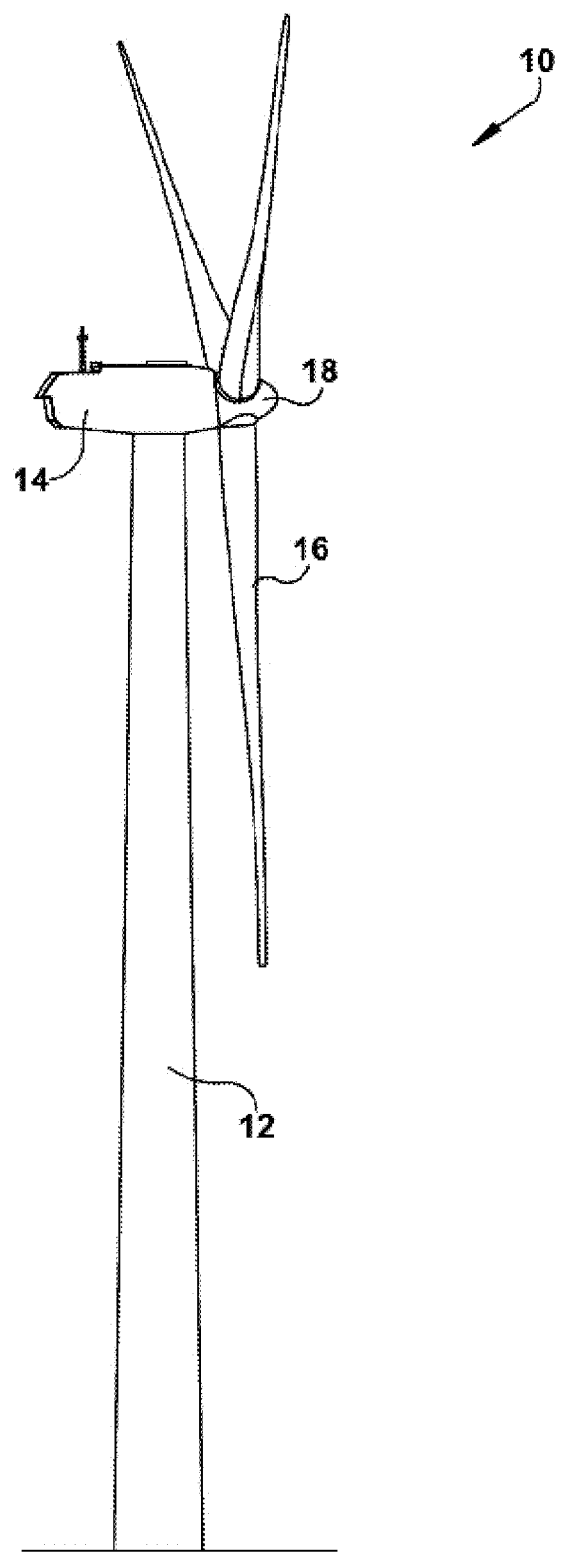
Fig. -1-

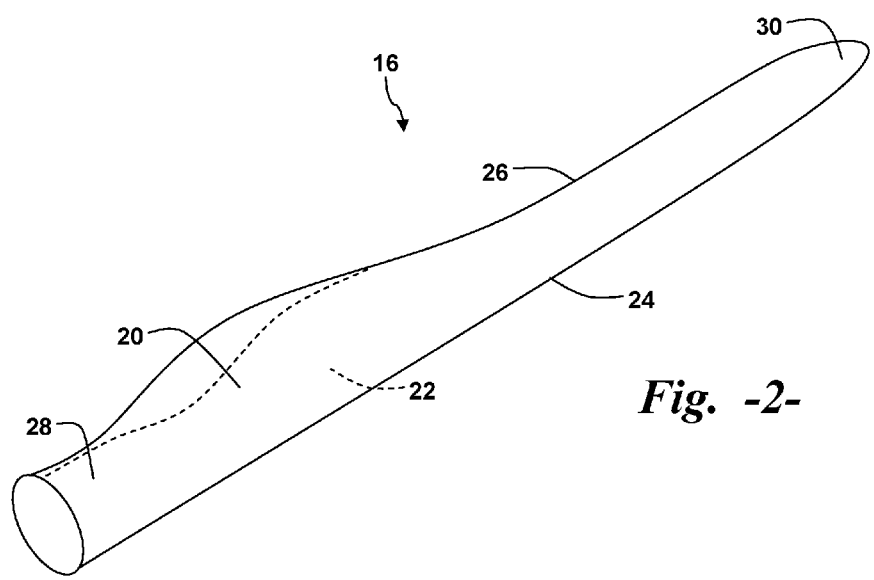
*Fig. -2-*
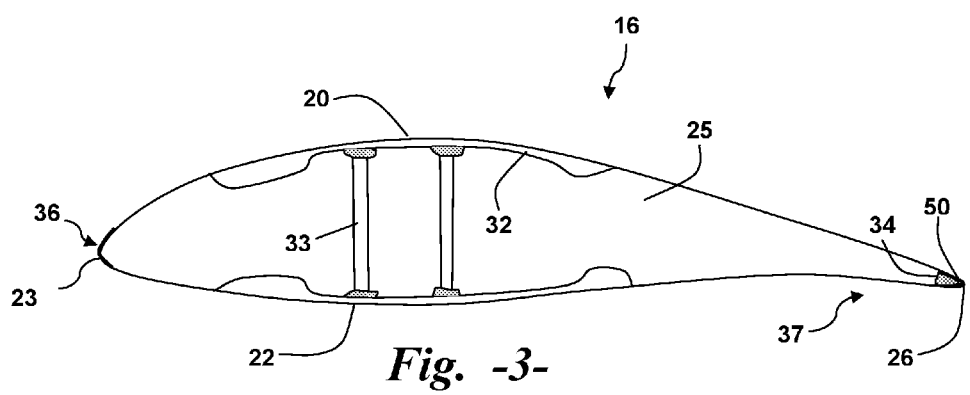
*Fig. -3-*

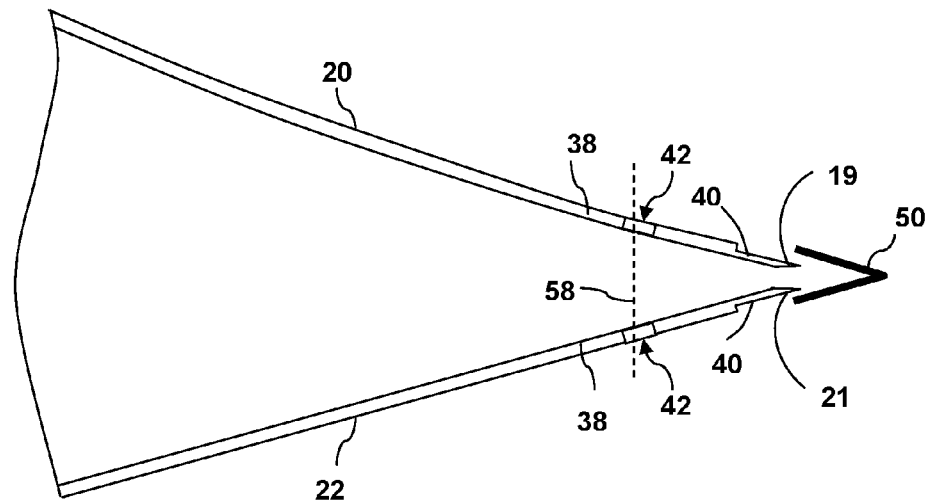
*Fig. -4-*
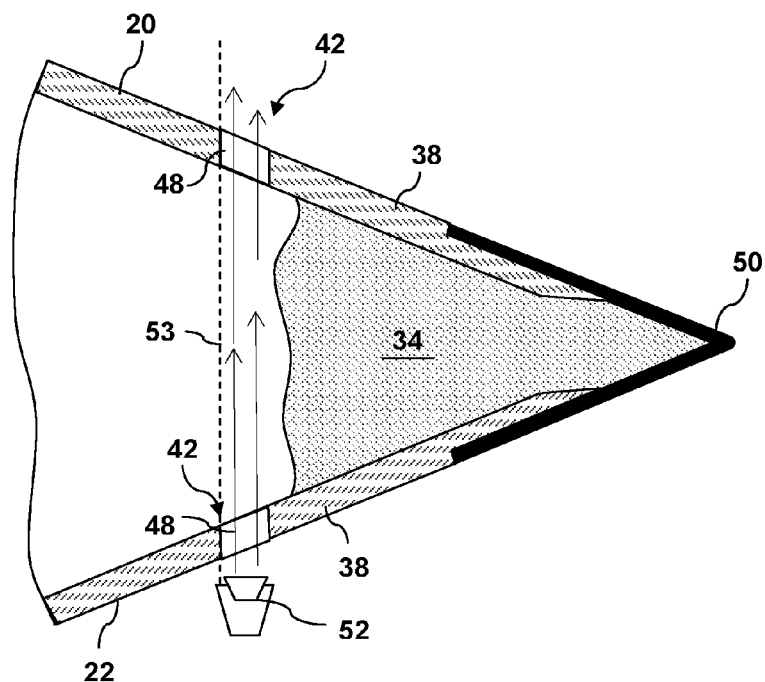
*Fig. -5-*

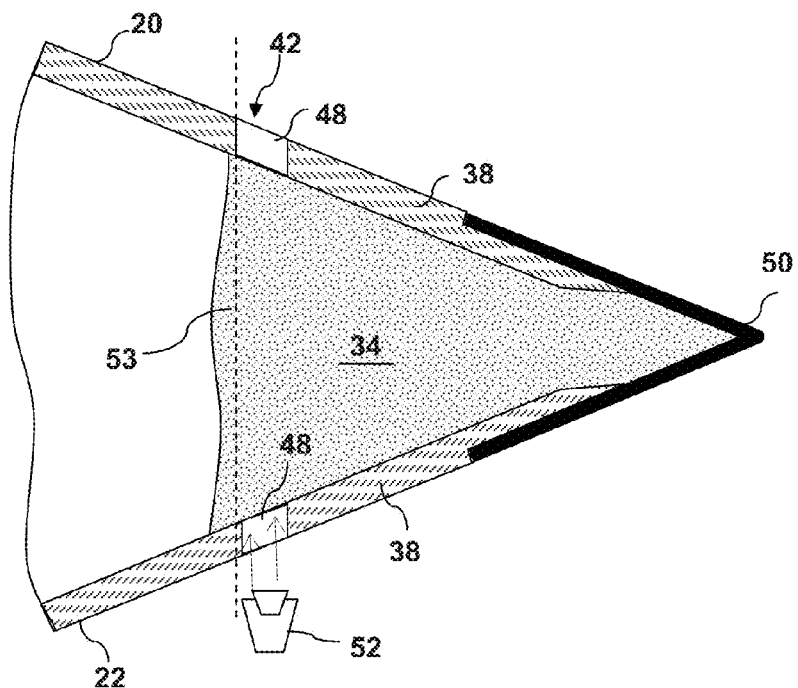
Fig. -6-
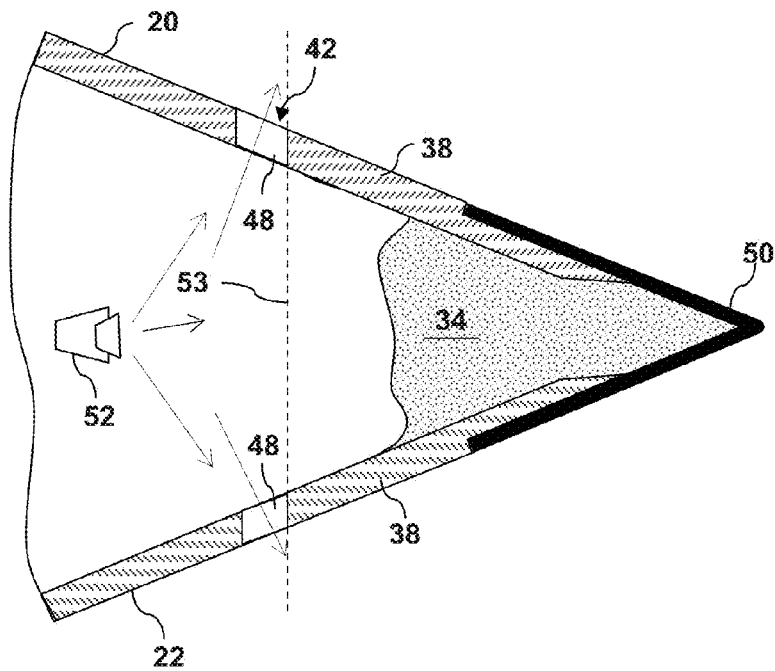
Fig. -7-

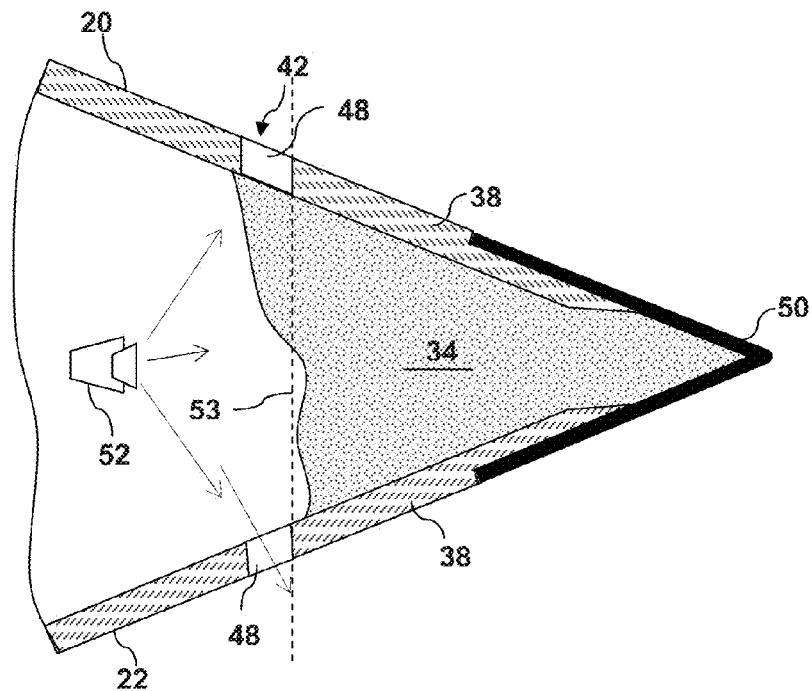
*Fig. -8-*
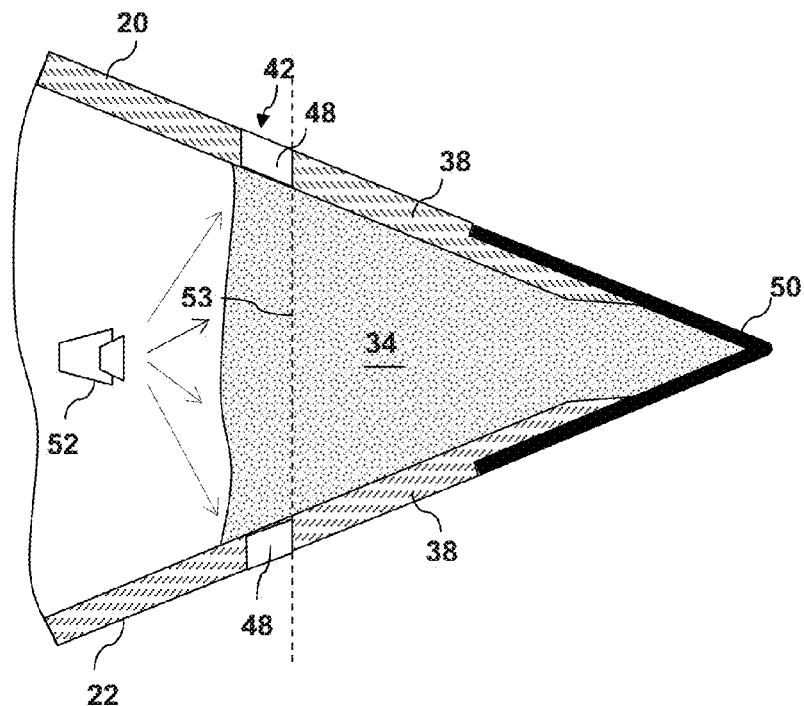
*Fig. -9-*

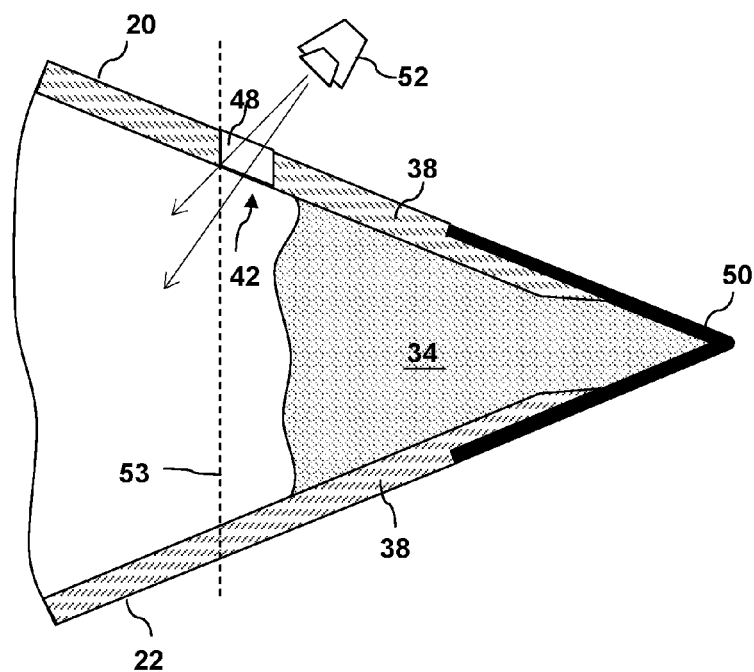
*Fig. -10-*
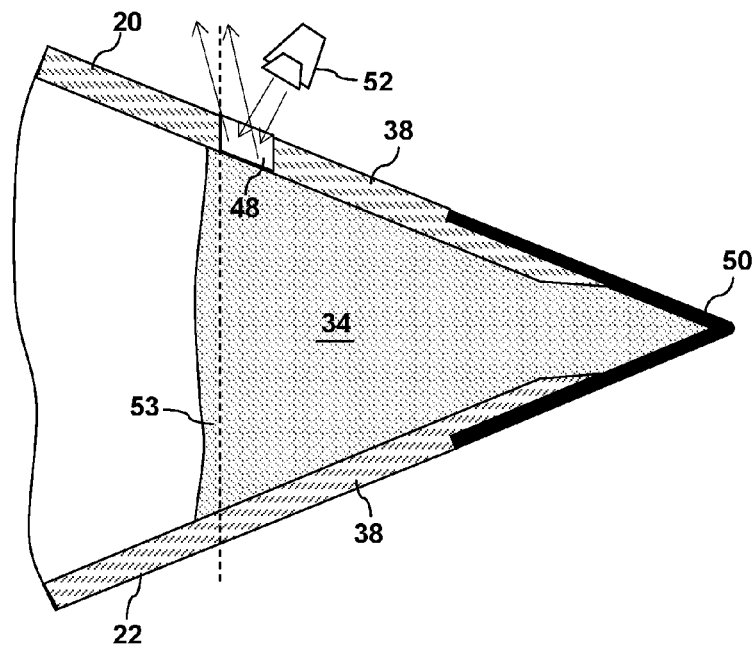
*Fig. -11-*

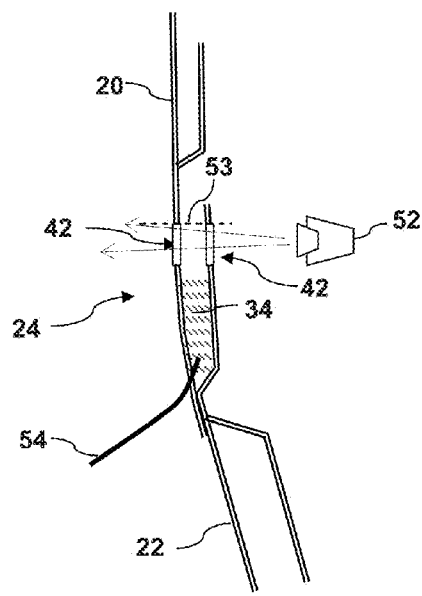
FIG. -12-
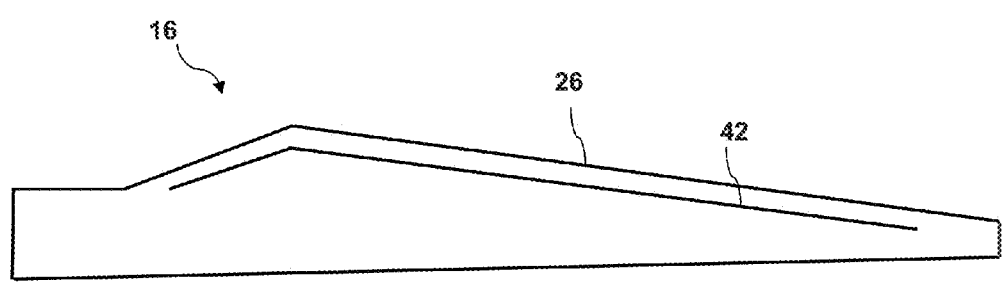
FIG. -13-

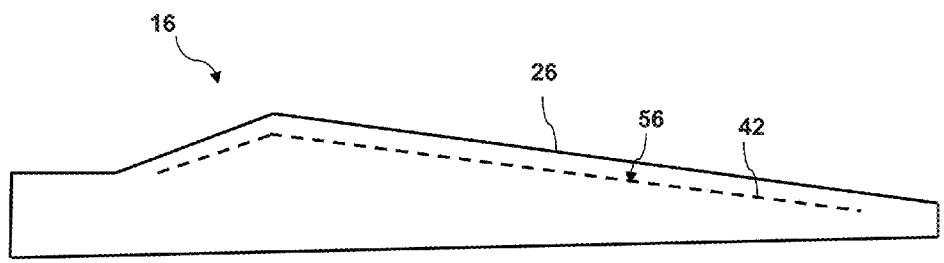
FIG. -14-
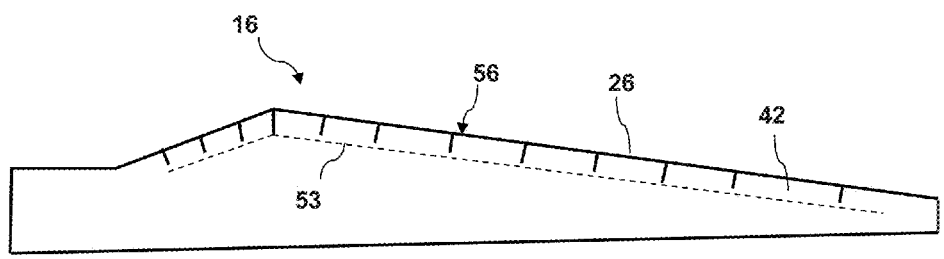
FIG. -15-

WIND TURBINE BLADE WITH BOND PASTE INSPECTION WINDOW AND ASSOCIATED METHOD

FIELD OF THE INVENTION

The present invention relates generally to the field of wind turbines, and more particularly to turbine blades having an improved system and method for ensuring a minimum bond width between the shell members, particularly along the trailing edge bonding line.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell and a lower (pressure side) shell that are bonded together at bond lines along the trailing and leading edges of the blade. The bond lines are generally formed by applying a suitable bonding paste or compound along the bond line with a minimum design bond width between the shell members. These bonding lines, particularly at the trailing edge of the blade, are a critical design constraint of the blades. A significant number of turbine blade field failures are bond line related, with trailing edge failures being the most common. Separation of the bond line along the trailing edge of an operational turbine blade can result in a catastrophic failure and damage to the wind turbine. In this regard, ensuring that the minimum design bond width of the bonding paste is achieved, particularly along the trailing edge bond line, is important.

Accordingly, the industry would benefit from an improved method and system for verifying that the minimum bond width of bond paste has been applied between the turbine blade shell members, particularly along the trailing edge of the blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having a leading edge and a trailing edge. The turbine blade includes an upper shell member and a lower shell member, with each of the upper and lower shell members having a chord-wise forward edge and a rearward edge. The forward edges are bonded at the leading edge and the rearward edges are bonded at the trailing edge of the blade with a bond paste applied between the respective forward edges and rearward edges. At least one of the shell members includes a first inspection window defined therein along one of the leading edge or trailing edge at a chord-wise location corresponding at least to a design minimum bond width of the bond paste applied at the respective edge. For example, the inspection window may be at the minimum bond width location or, alternatively, extend beyond the minimum bond width location (e.g., away from the blade edge) in the chord-wise direction. The first inspection window provides visible access through the shell member into the blade such that a visible indication is generated through the first inspection window when bond paste is injected and reaches the minimum bond width location or beyond.

The nature of the visible indication can vary within the scope and spirit of the invention. For example, in one embodiment, the visible indication is the visible observance of the bond paste through the first inspection window. An inspector, which may be a person, camera, or other visual detection means, simply sees or otherwise visually detects the bond paste through the inspection window.

In an alternate embodiment, the visible indication is light transmitted through the first inspection window from a light source. For example, if a light source is placed internal to the blade and light within the blade is detected through the inspection window, then the bond paste has not yet migrated to the inspection window or location where it blocks the light. If a light source is external to the inspection window and light shines externally through the inspection window without reflection, then the bond paste has not yet migrated to the inspection window or a location where it would reflect the light.

In one embodiment, a second inspection window is defined in the opposite shell member along the respective leading or trailing edge such that the first and second inspection windows are aligned along an axis at the minimum bond width location or beyond in the chord-wise direction. An external light source is oriented at one of the shell members to direct light externally along the axis, wherein when the bond paste migrates past one or both of the inspection windows, the light is prevented from passing through the blade and out through the opposite inspection window. Thus, the visual indication corresponds to the absence or decrease of light through the inspection window in the opposite shell member. Alternatively, in the dual inspection window embodiment, an internal light source may be provided post-molding of the blade, for example via an access hole or port in one of the shell members and at a location such that light generated within the blade will be externally visible through any inspection window that is not blocked by bond paste.

The inspection windows may be variously defined. In a particular embodiment, the inspection windows are formed from a passage defined through the core material of the shell member, wherein the passage is subsequently filled with resin during the molding process, the resin curing to a translucent state and sealing the passage while providing visible access into the blade for the purposes described herein.

The wind turbine blade can include a plurality of the first and second inspection windows. For example, a plurality of separate inspection windows may be spaced apart span-wise adjacent to the trailing edge in either or both of the shell members. In another embodiment, the inspection window may be a generally continuous window that extends span-wise adjacent to the respective leading or trailing edge. In a certain embodiment, the inspection windows may extend chord-wise from the blade edge at least to the location corresponding to the design minimum bond width such that the visible indication is also a quantitative indication of how close the bond paste has migrated to the design minimum bond width.

The present invention also encompasses various method embodiments for verifying that bond paste has migrated to at least a minimum design bond width along a leading or trailing edge of a wind turbine blade, the wind turbine blade having an upper shell member and a lower shell member with respective forward and rearward edges bonded together at the leading and trailing edges. The method includes defining a first inspection window through at least one of the shell members at a location corresponding to the design minimum bond width (or extending beyond in the chord-wise direction) at the respective leading edge or trailing edge. During bonding of the shell members, detection is made of a visual change through the inspection window as the bond paste migrates past the design minimum bond width location. In this manner, it is assured that a bond having the design minimum bond width is formed at the respective blade edge.

In one embodiment, the method includes defining a second inspection window in the opposite shell member along the respective leading or trailing edge such that the first and second inspection windows are aligned along an axis at the minimum bond width location or beyond. In a certain embodiment, the method includes directing light from a light source external to the wind turbine blade along the axis, wherein the visual change is an absence or decrease in light transmitted along the axis through the first and second inspection windows as the bond paste migrates past either or both of the first and second inspection windows. In an alternate embodiment, a light source is located internal to the wind turbine blade, for example through an access port in the shell member, wherein the visual change is an absence or decrease in light transmitted out through the first or second inspection windows as the bond paste migrates past the first and second inspection windows. This method may be desirable in that, by observing the light change at both inspection windows, it is ensured that the bond paste has migrated past both windows, thus creating a uniform bond at the minimum bond width.

In still another embodiment, the method includes transmitting light from a light source externally through the first inspection window, wherein the visual change is detection of reflected light from the bond paste as the bond past migrates past the first inspection window.

The method may include forming the inspection windows by defining a passage through core material of the shell members and filling the passage with resin during molding of the shell member, with the resin curing to a translucent state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of an embodiment of a conventional wind turbine blade;

FIG. 3 is a cross-sectional view of an exemplary wind turbine blade in accordance with aspects of the invention;

FIG. 4 is an enlarged cross-sectional and component view of a trailing edge configuration incorporating inspection windows in accordance with the invention;

FIG. 5 is an enlarged cross-sectional view of the embodiment of FIG. 4 in the process of bond paste being injected at the trailing edge;

FIG. 6 is an enlarged cross-sectional view of the embodiment of FIG. 5 after the bond paste has migrated past the inspection windows;

FIG. 7 is an enlarged cross-sectional view of an alternate trailing edge bond configuration in accordance with aspects of the invention;

FIG. 8 is an enlarged cross-sectional view of the embodiment of FIG. 7 after bond paste has migrated past one of the inspection windows;

FIG. 9 is an enlarged cross-sectional view of the embodiment of FIG. 8 after the bond paste has migrated past both inspection windows;

FIG. 10 is an enlarged cross-sectional view of an alternate trailing edge bond configuration in accordance with aspects of the invention;

FIG. 11 is an enlarged cross-sectional view of the embodiment of FIG. 10 after the bond paste has migrated past the inspection window;

FIG. 12 is a cross-sectional view of a leading edge bond configuration process in accordance with aspects of the invention;

FIG. 13 is a diagram of a wind turbine blade having a generally continuous inspection window defined adjacent the trailing edge;

FIG. 14 is a diagram of a wind turbine blade having a discontinuous pattern of inspection windows defined adjacent the trailing edge; and FIG. 15 is a diagram of a wind turbine blade having an alternate discontinuous pattern of inspection windows defined adjacent the trailing edge.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are bonded together at the leading edge 24 and trailing edge 26. The blade 16 includes an internal cavity 25 in which various structural members, such as spar caps 32 and webs 33, are configured.

Referring to FIG. 3, the shell members 20, 22 include respective forward edges that are bonded at a leading edge bond line 36 and at a trailing edge bond configuration 37 in accordance with aspects of the invention described in greater detail herein. The leading and trailing edge bond lines 36, 37 may use a conventional bond paste. It should be appreciated that the term "bond paste" is used herein in a generic sense to encompass any type of adhesive or bonding material that is injected between the shell members at the bond lines in a flowable state. The particular type of bond paste is not particularly relevant to the present invention, and any suitable type of epoxy, compound, or other material may be used in this regard.

A leading edge structural member 23, which may be a shaped reinforced composite member, may be provided along the leading edge bond line 36 to add rigidity and strength to the leading edge 24, as is known in the art. Likewise, referring to FIGS. 3 and 4 in general, a bond cap 50 may be provided as the component that actually defines the trailing edge 26 of the blade 16. The cap 50 may be a rigid component that is pre-formed into the designed size and shape of the trailing edge 26 and attached to the rearward edges 19, 21 of the upper and lower shell members 20 (e.g. within notches 40), 22 so as to define the trailing edge 26 along at least a portion of the blade 16. In this embodiment, the bond cap 50 is not a protective covering that is placed over an existing trailing edge of a blade, but is a rigid, structural component that extends from the rearward edges 19, 21 of the shell member, to define the designed trailing edge profile of the blade 16. The bond cap 50 defines an external bonding bridge that is the primary seal between the upper and lower shell members 20, 22 at the respective rearward edges 19, 21. Reference is made, for example, to U.S. Pat. No. 8,038,407 for a more complete description of this trailing edge configuration with a rigid bond cap 50. It should be appreciated that the present invention is not limited to use of a bond cap 50, or to a bond cap 50 having any particular construction. For example, the trailing edge may include a bond cap that acts as a protective covering placed over an existing trailing edge construction.

At least one of the shell members 20, 22 includes a first inspection window 42 defined therein along one of the leading edge 24 or trailing edge 26. Referring to the embodiment of FIGS. 4 through 6, an inspection window 42 is provided in each shell member 20, 22. The inspection windows 42 are at a chord-wise location corresponding at least to a design minimum bond width of the bond paste applied at the respective edge. For illustrative purposes, the design minimum bond width is depicted in FIGS. 4 through 6 as the dashed line 53. The inspection windows 42 in this embodiment are located such that their forward edge (towards the leading edge of the blade) is essentially at the design minimum bond width line 53. In this configuration, once the bond paste 34 migrates completely past the inspection windows 42, it is ensured that the bond line is formed with the design minimum bond width. In an alternate embodiment depicted, for example, in FIGS. 7 through 9, the inspection windows 42 are located at a chord-wise location that is beyond the design minimum bond width line 53 in the chord-wise direction. With this configuration, once the bond paste 34 migrates into the inspection windows 42, it is ensured that the bond line is formed with the design minimum bond width. An excess bond width margin is created if sufficient bond paste is injected to migrate further into (or past) the inspection windows 42.

As mentioned, the nature of the visible indication can vary within the scope and spirit of the invention. The visible indication may be the visible observance of the bond paste 34 through the either of the inspection windows 42. The bond paste 34 may have a color, texture, or other characteristic that visibly changes the field of view through the inspection window 42 as the bond paste 34 moves into and past the window 42. An additive (e.g., a color additive) may be added to the bond paste 34 for this purpose. An inspector, which may be a person, camera, or other visual detection means (e.g., including computer implemented recognition software/hardware), simply sees or otherwise visually detects the bond paste 34 through the inspection window 42.

The visible indication may be light transmitted (in either direction) through a first inspection window 42 from a light source 52. For example, referring to FIGS. 7 through 9, a light source 52 may be placed internal to the blade 16 during the bonding process, e.g., through an access port adjacent to the trailing edge. If the internal light 52 within the blade 16 is detected through either inspection window 42, then the bond paste 34 has not yet migrated to the respective inspection window 42, and thus has not reached the design minimum bond width, as particularly depicted in FIG. 7.

In the embodiment depicted in FIGS. 10 and 11, the light source 52 is external to the inspection window 42 and shines light externally through the inspection window 42. The light source 52 is oriented so as to pass light through the inspection window 42 with minimum reflection (other than some surface reflection off of the inspection window 42). Once the bond paste 34 migrates past the inspection window 42, significantly more light will be reflected back through the inspection window 42 directly from the bond paste 34, as depicted in FIG. 11. Any manner of light sensitive receiver may be disposed to capture and measure the reflected light in this regard.

In the embodiment of FIGS. 4 through 6, two inspection windows 42 are utilized and are defined in the opposite shell members 20, 22 along the respective leading or trailing edge such that the first and second inspection windows 42 are aligned along an axis 58 (FIG. 4) that is at the minimum bond width location 53 or beyond in the chord-wise direction. An external light source 52 is oriented at one of the shell members 20, 22 to direct light externally along the axis 58. So long as bond paste 34 has not migrated past either inspection window 42, the light is transmitted through the blade 16 and out the opposite inspection window 42 (e.g., is visible through the opposite inspection window 42), as depicted in FIG. 5. Referring to FIG. 6, when the bond past migrates past one or both of the inspection windows 42, the light is prevented from passing through the blade and out through the opposite inspection window 42. Thus, the visual indication corresponds to the absence or decrease of light through the inspection window 42 in the opposite shell member 20.

FIGS. 7 through 9 present an alternative dual inspection window 42 embodiment wherein an internal light source 52 is provided post-molding of the blade, for example via an access hole or port in one of the shell members 20, 22 and at a location such that light generated within the blade 16 will be externally visible through any inspection window 42 that is not blocked by bond paste 34, as depicted in FIG. 7. In FIG. 8, the bond paste 34 has migrated past the inspection window 42 in the shell member 20. However, this does not necessarily ensure that the bond paste 34 has migrated uniformly past the design minimum bond width 53, as can be readily appreciated from FIG. 8. Light from the internal source 52 is visible through the opposite inspection window 42 in shell member 22, thus providing a visual indication that the bond paste 34 has not yet migrated uniformly to the line 53. In FIG. 9, the bond paste 34 has migrated past both inspection windows 42, and the lack of visible light at either window 42 is an indication that the bond paste has migrated uniformly to the design minimum bond width 53.

Various processes for bonding shell members 20, 22 with bond paste at the leading edge 24 and trailing edge 26 are well known to those skilled in the art, and need not be described in detail herein for an understanding and appreciation of the present invention. The present methods and wind turbine blades are not limited to any particular bonding process. One process and bonding system that may be useful with the present invention is described in U.S. Pat. No. 8,409,381.

The inspection windows 42 may be variously defined in the respective shell members 20, 22. In a particular embodiment, the inspection windows 42 are formed from a passage or hole defined through the core material 38 of the shell member, wherein the passage is subsequently filled with resin 48 during the shell molding process. The resin 48 fills and seals the hole, and cures to a translucent state, thereby providing visible access into the blade 16 through the resin 48 for the purposes described herein. In an alternate embodiment, translucent or clear plugs may be inserted into holes or passages defined in the shell members 20, 22 after the molding process.

It should be appreciated that the verification processes described herein are not limited to the trailing edge bond line. For example, FIG. 12 depicts dual inspection windows 42 defined in the opposite overlapping sections of the shell member 20, 22 at the leading edge 24. A fill hose 54 is depicted as injecting bond past 34 between the shell members 20, 22, while an internal light source 52 shines light through the aligned inspection windows 42, as discussed above.

Referring to FIGS. 13 through 15, the wind turbine blade 16 can include a plurality of the first and second inspection windows 42 disposed along various line patterns 56 along the leading or trailing edge. For example, in FIG. 14, a plurality of separate inspection windows 42 are spaced apart span-wise adjacent to the trailing edge 26 in either or both of the shell members. The inspection windows may have any desired shape, e.g., circular, oblong, and so forth. As depicted in FIG. 13, a single inspection window 42 may defined as a continuous window that extends span-wise adjacent to the respective leading or trailing edge 26. Referring to FIG. 15, it may be desired in a certain embodiment to extend the inspection windows 42 chord-wise from the blade edge at least to the location corresponding to the design minimum bond width 53. With this configuration, the visible indication is also a quantitative indication of how far the bond paste is from the design minimum bond width during the bonding process. In other words, one can observe the progress of the bond paste 34 as it migrates towards the design minimum bond width 53.

The present invention also encompasses various method embodiments for verifying that bond paste has migrated to at least a minimum design bond width along a leading or trailing edge of a wind turbine blade, wherein the blade has an upper shell member and a lower shell member with respective forward and rearward edges bonded together at the leading and trailing edges, as discussed above. The method includes defining a first inspection window through at least one of the shell members at a location corresponding to the design minimum bond width (or extending beyond the design minimum bond width in the chord-wise direction) at the respective leading edge or trailing edge. During bonding of the shell members, detection is made of a visual change through the inspection window as the bond paste migrates past the design minimum bond width location. In this manner, it is assured that a bond having the design minimum bond width is formed at the respective blade edge.

In one embodiment, the method includes defining a second inspection window in the opposite shell member along the respective leading or trailing edge such that the first and second inspection windows are aligned along an axis at the minimum bond width location or beyond. In a certain embodiment, the method includes directing light from a light source external to the wind turbine blade along the axis, wherein the visual change is an absence or decrease in light transmitted along the axis through the first and second inspection windows as the bond paste migrates past either or both of the first and second inspection windows. In an alternate embodiment, a light source is located internal to the wind turbine blade, for example through an access port in the shell member, wherein the visual change is an absence or decrease in light transmitted out through the first or second inspection windows as the bond paste migrates past the first and second inspection windows. This method may be desirable in that, by observing the light change at both inspection windows, it is ensured that the bond paste has migrated past both windows, thus creating a uniform bond at the minimum bond width.

In still another embodiment, the method includes transmitting light from a light source externally through the first inspection window, wherein the visual change is detection of reflected light from the bond paste as the bond past migrates past the first inspection window.

The method may include forming the inspection windows by defining a passage through core material of the shell members and filling the passage with resin during molding of the shell member, with the resin curing to a translucent state.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade with a leading edge and a trailing edge, said blade comprising:

an upper shell member and a lower shell member, each of the upper shell member and said lower shell member comprising a chord-wise forward edge and a rearward edge, the forward edges bonded at the leading edge and the rearward edges bonded at the trailing edge with a bond paste applied between the respective forward edges and rearward edges;

at least one of the shell members comprising a first inspection window defined therein along one of the leading edge or trailing edge at a location corresponding at least to a design minimum bond width of the bond paste applied at the respective leading edge or trailing edge;

the first inspection window providing a visible access through the shell member such that a visible indication is generated through the first inspection window when bond paste is injected and reaches the minimum bond width location or beyond in the chord-wise direction; and the first inspection window comprises a passage defined through core material of the shell member, the passage filled with a translucent material, wherein the core material of the shell member prevents visible access through the shell member such that the visible indication of the bond paste is given only when the pond paste flows under the first inspection window.

2. The wind turbine blade as in claim 1, wherein the visible indication is the visible presence of the bond paste through the first inspection window.

3. The wind turbine blade as in claim 1, wherein the visible indication is light transmitted through the first inspection window from a light source.

4. The wind turbine blade as in claim 1, further comprising a second inspection window defined in the opposite shell member along the respective leading or trailing edge such that the first and second inspection windows are aligned along an axis at the minimum bond width location or beyond in the chord-wise direction.

5. The wind turbine blade as in claim 1, wherein the translucent material is one of a translucent resin filled in the passage or a translucent plug inserted into the passage.

6. The wind turbine blade as in claim 1, comprising a plurality of the inspection windows spaced apart span-wise adjacent to the trailing edge.

7. The wind turbine blade as in claim 1, wherein the inspection window extends chord-wise from the trailing edge at least to the location corresponding to the design minimum bond width such that the visible indication is also a quantitative indication of closeness of the bond paste to the design minimum bond width.

8. A method for verifying that bond paste has migrated to at least a minimum design bond width along a leading or trailing edge of a wind turbine blade, the wind turbine blade having an upper shell member and a lower shell member with respective forward and rearward edges bonded together at the leading and trailing edges, the method comprising:

defining a first inspection window through at least one of the shell members at a location corresponding to the design minimum bond width or beyond at the respective leading edge or trailing edge;

during bonding of the shell members, detecting a visual change through the inspection window as the bond paste migrates past the design minimum bond width location; and the first inspection window defined by forming a passage through core material of the shell member and filling the passage with a translucent material, wherein the core material of the shell member prevents visible access through the shell member such that the visible indication of the bond paste is given only when the pond paste flows under the first inspection window.

9. The method as in claim 8, further comprising defining a second inspection window in the opposite shell member along the respective leading or trailing edge such that the first and second inspection windows are aligned along an axis at the minimum bond width location or beyond, and directing light from a light source external to the wind turbine blade along the axis, wherein the visual change is an absence or decrease in light transmitted through the first and second inspection windows as the bond paste migrates past the first and second inspection windows.

10. The method as in claim 8, further comprising transmitting light from a light source externally through the first inspection window, wherein the visual change is detection of reflected light from the bond paste as the bond paste migrates past the first inspection window.

11. The method as in claim 8, wherein the first inspection window is defined along the trailing edge of the wind turbine blade.

12. The method as in claim 11, further comprising defining a plurality of the first inspection windows spaced apart span-wise adjacent to the trailing edge.

13. A method for verifying that bond paste has migrated to at least a minimum design bond width along a leading or trailing edge of a wind turbine blade, the wind turbine blade having an upper shell member and a lower shell member with respective forward and rearward edges bonded together at the leading and trailing edges, the method comprising:

defining a first inspection window through at least one of the shell members at a location corresponding to the design minimum bond width or beyond at the respective leading edge or trailing edge;

during bonding of the shell members, detecting a visual change through the inspection window as the bond paste migrates past the design minimum bond width location; and further comprising defining a second inspection window in the opposite shell member along the respective leading or trailing edge such that the first and second inspection windows are aligned along an axis at the minimum bond width location or beyond, and directing light from a light source internal to the wind turbine blade, wherein the visual change is an absence or decrease in light transmitted out through the first or second inspection windows as the bond paste migrates past the first and second inspection windows.

14. The method as in claim 13, wherein the absence or decrease in light is detected from each of the first and second inspection windows.

15. A method for verifying that bond paste has migrated to at least a minimum design bond width along a leading or trailing edge of a wind turbine blade, the wind turbine blade having an upper shell member and a lower shell member with respective forward and rearward edges bonded together at the leading and trailing edges, the method comprising:

defining a first inspection window through at least one of the shell members at a location corresponding to the design minimum bond width or beyond at the respectively leading edge or trailing edge;

during bonding of the shell members, detecting a visual change through the inspection window as the bond paste migrates past the design minimum bond width location; and wherein the first inspection window is defined as a continuous span-wise window adjacent to the trailing edge.

16. A method for verifying that bond paste has migrated to at least a minimum design bond width along a leading or trailing edge of a wind turbine blade, the wind turbine blade having an upper shell member and a lower shell member with respective forward and rearward edges bonded together at the leading and trailing edges, the method comprising:
- defining a first inspection window through at least one of the shell members at a location corresponding to the design minimum bond width or beyond at the respective leading edge or trailing edge;
- during bonding of the shell members, detecting a visual change through the inspection window as the bond paste migrates past the design minimum bond width location; and
- wherein the first inspection window is formed by defining a passage through core material of the shell member and filling the passage with resin during set-up of the shell member, the resin curing to a translucent state.

* * * * *